United States Patent [19]

Heath et al.

[11] 4,214,673
[45] Jul. 29, 1980

[54] CUP-SHAPED COFFEE FILTER DISPENSER

[75] Inventors: Forrest D. Heath, Farmington, N. Mex.; Rodney K. Hoctor, Harlingen, Tex.

[73] Assignee: Olman Heath Company, Farmington, N. Mex.

[21] Appl. No.: 916,595

[22] Filed: Jun. 19, 1978

[51] Int. Cl.² .............................................. B65H 3/02
[52] U.S. Cl. ................................... 221/259; 221/261; 271/42; 271/167
[58] Field of Search ............................ 221/213–216, 221/259, 210, 261, 276, 36, 37, 40, 41; 271/42, 167

[56] References Cited

U.S. PATENT DOCUMENTS

| 930,619 | 8/1909 | Russell | 221/259 X |
|---|---|---|---|
| 2,193,139 | 3/1940 | Monteith et al. | 89/1.5 H |
| 2,568,413 | 9/1951 | Rubisch | 221/213 X |
| 2,639,959 | 5/1953 | Couden | 221/43 |
| 3,133,672 | 5/1964 | Thomasma et al. | 221/259 X |
| 3,300,085 | 1/1967 | Simor | 221/41 |
| 3,871,641 | 3/1975 | Marx et al. | 221/210 X |
| 4,121,726 | 10/1978 | Pemberton | 221/213 X |

*Primary Examiner*—F. J. Bartuska
*Attorney, Agent, or Firm*—Richard D. Law

[57] ABSTRACT

A holder for a stack of fluted, cup-shaped coffee filter papers having a cover including a reciprocable, single paper dispenser arm secured in the cover, and a filter contact on the dispenser arm.

4 Claims, 4 Drawing Figures

CUP-SHAPED COFFEE FILTER DISPENSER

This invention relates to dispensers for dispensing a single filter paper from a stack of fluted, cup-shaped coffee filter papers.

Recently, overhead heated reservoir, single pass drip type coffee makers have become very popular. These coffee makers have the upper reservoir, for water, which is heated and then slowly released to a ground coffee supply. The ground coffee supply is placed in a fluted, cup-shaped filter paper, and then slowly released hot water drips through the coffee grounds into a glass container below the coffee grounds. These units are quite rapid in making a pot of coffee, some five minutes or less. The filter papers play a large part in the procedure in providing clear coffee.

These fluted cup-shaped filter papers commonly called "filters" are generally sold in a stack, usually 100 in a package. The filter paper is relatively thin, and pressed into the fluted, stacked supply, and thus are not conveniently and quickly retrieved one at a time. It is not an uncommon occurrance to unintentionally pull out two or three filter papers at a time, and to use the multiple filters. This is due to the fact that the filters adhere strongly to one another, probably due to the formation of the fluted and stacked construction. In any event, the pulling of a single, fluted, cup-shaped filter from a stack is difficult and an annoyance.

OBJECTS AND ADVANTAGES OF THE INVENTION

Included among the objects and advantages of the invention is to provide a dispenser for a single fluted, cup-shaped coffee filter of filter papers from a stack of the same.

Another object of the invention is to provide a storage container, which, also, dispenses a single one, for fluted cup-shaped coffee filters.

Another object of the invention is to provide a simple, easily constructed and easily used dispenser for a single filter from a stack of fluted, cup-shaped filters for single pass coffee makers.

Another object of the invention is to provide a simple, easily constructed and easily used dispenser for a single filter from a stack of fluted, cup-shaped filters for coffee makers.

Yet another object of the invention is to provide a container-dispenser for one of a stack of fluted, cup-shaped coffee filters, in which the container is provided with friction surfaces for holding the stack of filters during the dispensing of a single filter.

A still further object of the invention is to provide a dispenser for fluted, cup-shaped coffee filters which may be used as a package for the stack of such filters and used as a storage container and dispenser for single filters.

An additional object of the invention is to provide a simple container with a cover which may be molded as a single piece, including hinge means between the container and the cover, and a dispensing unit may be simply and easily added to the cover.

GENERAL DESCRIPTION OF THE DRAWINGS

SPECIFIC DESCRIPTION OF THE DRAWINGS

Figure 1:
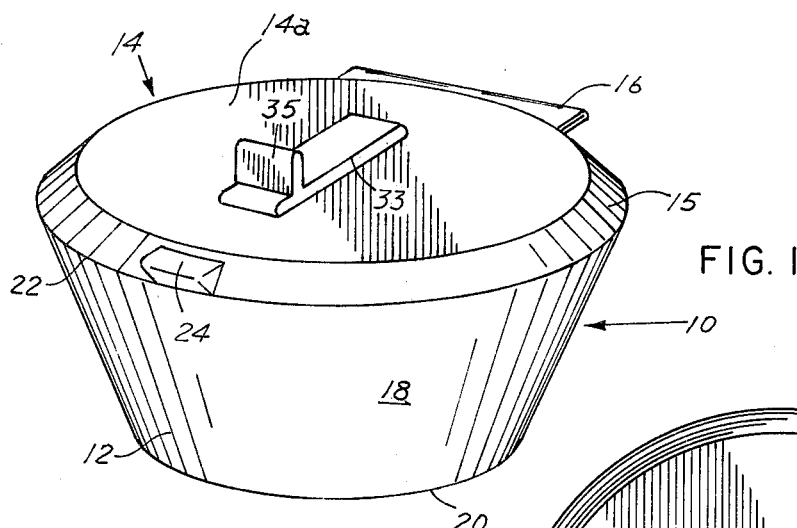
FIG. 1 is a perspective view of a dispensing container for a single filter from a stack of fluted, cup-shaped coffee filters, according to the invention, in closed storage condition.
Figure 2:
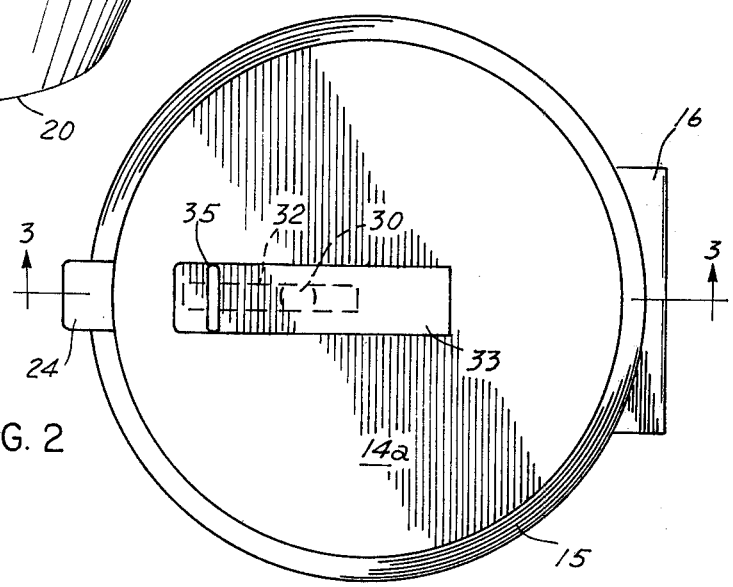
FIG. 2 is a top plan view of the device of FIG. 1.
Figure 3:
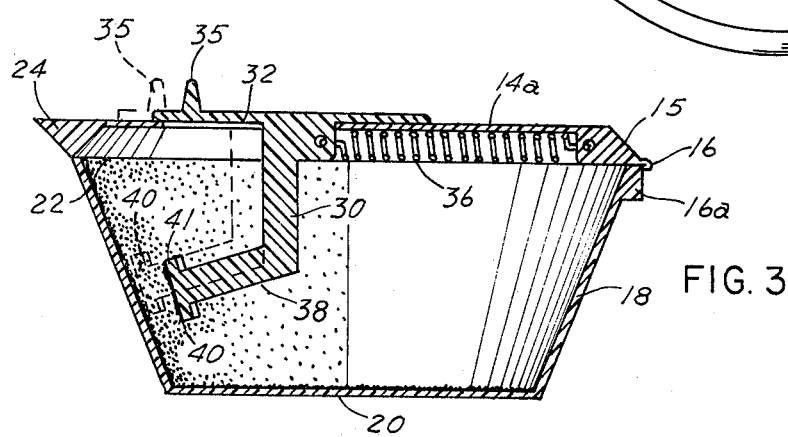
FIG. 3 is cross-sectional view of the dispenser of FIG. 2, taken along section line 3—3.
Figure 4:
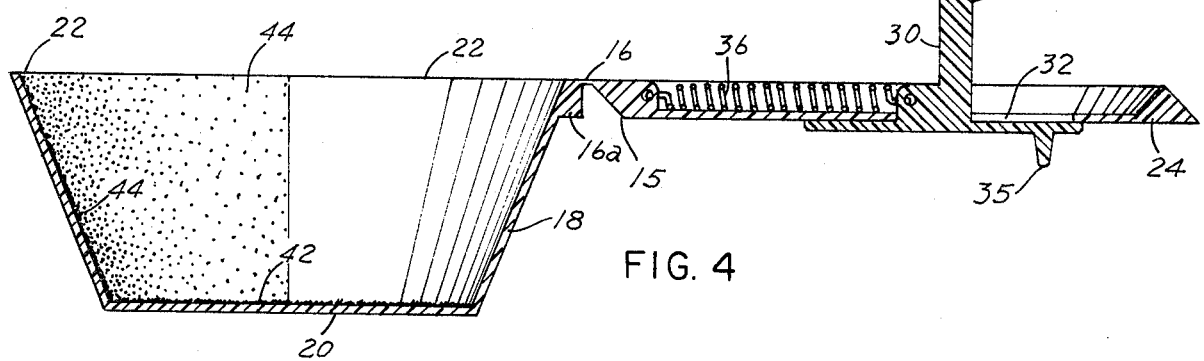
FIG. 4 is a cross-sectional view of the dispensing container of the invention with the cover in open position.

In the device selected for illustration, the dispensing container, of the invention, may preferably be made of a synthetic polymer, such as polystyrene, for economy, strength and lightness, but may be made of any suitable material, including treated and pressed paper, cardboard, etc., other plastics such as: polyvinyls (polyvinylchloride, copolymers, etc.), polyethylene, A.B.S., polyurethane, polyesters, etc., which are capable of forming thin sheets with sufficient strength for the container, etc. The material may be reinforced in numerous common methods, with strengthening materials, etc., when desired.

The unit (shown generally be numeral 10) includes a generally cup-shaped bottom portion 12 and a cover 14. The cover is hinged to the bottom portion by means of a hinge 16. When molded as a one piece elastomeric unit, the bottom, cover and hinge are of the same material. In such a case, the hinge 16 is formed of a thin band of material between the two parts, and the elastomeric material is flexible enough to permit repeated bending as a hinge, without rupturing. A treated paper material, pressed into shape, may form a one piece unit with the hinge of the same material.

The bottom section includes a sloped, continuous side wall 18 and a bottom closure wall 20. The side wall is sloped outwardly from the bottom wall 20 to an open top of larger diameter than the diameter of the bottom wall. The side wall slopes upwardly at about 68°, for example, for a bottom portion having a bottom wall of 15.2 cm diameter, an open top of 21.8 cm diameter, and a height of the top edge of the wall to the bottom wall of 8.9 cm. This size will readily accomodate the conventionally sized, stack of fluted, cup-shaped coffee filters used in the heatable, overhead reservoir type coffee makers. One known brand of such a coffee maker is "Mr. Coffee", a trademarked name. The top edge of the side wall is smooth to the inside without a lip or overhang. This permits a filter to be slid upwardly along the wall without catching.

The cover includes a central planar portion 14a with a sloped peripheral portion 15 having an even and smooth under edge for peripheral flush seating with the edge 22 of the bottom side wall. The cover seats loosely on the bottom, being held in place by the hinge 16, including a hinge support 16a depending from the bottom. The cover is easily raised by a slight pressure upwardly on a finger hold 24 opposite the hinge 16.

For a polyvinylchloride material, a 3 mm thickness of the bottom section, and a 3 mm thickness of the top section 14, is very satisfactory. The hinge 16 may be of about 1 mm thickness, permitting multiple bendings without damage.

A dispensing arm 30 depends from a slit 32 in the cover 14. The arm extends into the bottom section when the cover is closed. On the upper side of the cover is a slide plate 33 to which the arm 30 is attached. The plate 33 generally covers the slit 32, and the arm 30 being an elongated rectangle, slides in the slit holding the plate in alignment. A finger hold 35 on the slide 33 provides means for pulling the slide and its attached arm toward the distill end of the slit. The arm is biased by spring 36 toward the rear of the slit and toward the hinge 16.

An angled extension 38 is secured to and depends outwardly and downwardly from arm 30 toward the inside of side wall 18. A filter contact member 40 depends from the extension 30, at about the same angle as the side wall. A high friction surface 41 is secured on the contact member 40, for contacting and holding a filter paper when pressed into it. The high friction surface may be an abrasive. One satisfactory abrasive being a piece of coarse sandpaper secured on the contact member, and this may be attached by rubber cement, for example. The bottom wall 20 is preferably covered with a high friction surface 42, which may be also a sandpaper piece adhered by rubber cement. A portion of the inside of the wall 18 may be covered by a high friction surface, such as sandpaper 44 covering about ½ of the inside surface of the side wall opposite the hinge. The sandpaper may be secured to the wall by rubber cement. In place of the sandpaper, a roughened surface, acting much like the sandpaper, may be used. The high friction surface is intended to hold and separate a single paper from the stack of filters, as explained below.

For use, a stack of filter papers, of the fluted, cup-shaped type, are placed in the bottom section. As pointed out, the bottom section may be made to hold a 100 or so filters; one hundred being one conventional number commercially available. With the stack in place, one finger is placed in the handle 35 and a thumb placed on handle 24, or vice-versa. The handle 35 is pulled toward handle 24 so that contact member 41 is pulled tightly into contact with the stack of filter papers. The contact should be sufficiently strong to somewhat depress the flutes under the contact member. A slight upward pull of the cover will now pull up a single filter paper from the stack. The slit is long enough to maintain the pressure on the pad 41 in contact with papers as the cover is raised, thus pulling the single coffee filter paper up to position to be grasped and removed from the stack. On release of the pressure on the handles, the cover returns to its original biased position, and the extension arm is pulled to the back of the slit by the spring. The unit is then ready for a repeat of the dispensing.

As pointed out, the unit may be inexpensively manufactured so it may be used as the commercial package, usually with a transparent plastic overcover.

While the invention has been described by reference to specific illustrations, there is no intent to limit the spirit or scope of the invention to the precise details as set forth, except as defined in the following claims.

What is claimed is:

1. A coffee filter dispenser for dispensing a single filter from a stack, comprising:
    (a) cup-shaped filter holder means, of the general configuration of the filters, formed of an elastomeric material and provided with an outwardly sloped wall from a bottom wall to a full opening which is substantially larger than said closed bottom walls;
    (b) cover means for said full opening enclosing said holder means integrally secured thereto and hingedly attached thereto by a thin section of said elastomeric material;
    (c) there being a slit in said cover means directed from said hinged attachment toward and spaced from, an edge of said cover means;
    (d) an arm reciprocally extending through said slit and terminating at its lower end adjacent said sloped wall, and arm handle means reciprocably seated on said cover means and secured to said arm through said slit, said arm handle means arranged to move said arm along said slot thereby moving said lower end of said arm toward and away from said sloped wall and lifting said cover as said arm moves up said sloped wall;
    (e) an abrasive surface filter contacting and holding means secured to the end of said arm whereby said arm may be moved so that said contacting and holding means may contact a filter in said holder means, and,
    (f) cover handle means depending outwardly from said cover means in alignment with said slot.

2. A cup-shaped coffee filter dispenser according to claim 1, being further characterized by said cup-shaped holder means including an abrasive surface in the area of contact of said contacting and holding means.

3. A cup-shaped coffee filter dispenser according to claim 1, wherein friction increasing means is applied to the surface of said cup-shaped filter holder means, at least in an area around and adjacent the contact area of said contacting and holding means and said cup-shaped filter holder means.

4. A cup-shaped coffee filter dispenser according to claim 3, wherein said friction increasing means is an abrasive.

* * * * *